(12) United States Patent
Chopra et al.

(10) Patent No.: US 9,929,910 B1
(45) Date of Patent: Mar. 27, 2018

(54) PREDICTIVE AND CORRECTIVE CONFIGURATION CHECKER

(71) Applicant: EMC IP Holding Company LLC, Hopkinton, MA (US)

(72) Inventors: Shelesh Chopra, Bangalore (IN); Shivanand Chougala, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 222 days.

(21) Appl. No.: 14/576,040

(22) Filed: Dec. 18, 2014

(51) Int. Cl.
*G06F 15/16* (2006.01)
*H04L 12/24* (2006.01)

(52) U.S. Cl.
CPC ...... *H04L 41/0869* (2013.01); *H04L 41/0853* (2013.01); *H04L 41/0863* (2013.01)

(58) Field of Classification Search
CPC .................................................. H04L 49/557
See application file for complete search history.

(56) References Cited

U.S. PATENT DOCUMENTS

| | | | | |
|---|---|---|---|---|
| 7,383,534 B1* | 6/2008 | Agbabian | ................. | G06F 8/71 717/108 |
| 8,583,769 B1* | 11/2013 | Peters | ..................... | G06F 9/541 709/221 |
| 8,811,597 B1* | 8/2014 | Hackbarth | ....... | G06Q 10/06393 379/265.02 |
| 2004/0193953 A1* | 9/2004 | Callahan | ............. | G06F 11/1451 714/15 |
| 2007/0283049 A1* | 12/2007 | Rakowski | ........... | G06F 9/44505 709/246 |
| 2009/0216867 A1* | 8/2009 | Pusateri | ................ | H04L 41/022 709/222 |
| 2014/0115285 A1* | 4/2014 | Arcese | ................ | G06F 9/45533 711/162 |
| 2014/0149696 A1* | 5/2014 | Frenkel | ............... | G06F 9/45558 711/162 |
| 2014/0195793 A1* | 7/2014 | Lindteigen | ............ | H04L 63/123 713/100 |
| 2014/0245268 A1* | 8/2014 | Golender | ............ | G06F 11/3636 717/128 |

* cited by examiner

*Primary Examiner* — Arvin Eskandarnia
*Assistant Examiner* — Kamran Mohammadi
(74) *Attorney, Agent, or Firm* — Van Pelt, Yi & James LLP

(57) ABSTRACT

A first configuration tag is received from a host, wherein each configuration tag comprises a configuration state and a configuration value pair for a given software. The first configuration tag is stored with a first timestamp. A second configuration tag is received from the host. The second configuration tag is stored with a second timestamp. A difference is determined between the first configuration tag and the second configuration tag.

18 Claims, 8 Drawing Sheets

← 202

```
<TAG1>
<PROPERTY1><OS VERSION=X></PROPERTY1>
<PROPERTY2><MEMORY=X></PROPERTY2>
<PROPERTY3<MULTIPATHING CONFIG=X></PROPERTY3>
<PROPERTY4><PATCH VERSION=X></PROPERTY4>
<PROPERTY5><BACKUP SOFTWARE VERSION=X></PROPERTY5>
<PROPERTY6><SERVER PARALLELISM=X></PROPERTY6>
<PROPERTY7><READ CACHE=X></PROPERTY7>
<PROPERTY8><WRITE CACHE=X></PROPERTY8>
<PROPERTY9><HBA=X></PROPERTY9>
<PROPERTY10><SAN SOFTWARE VERSION=X></PROPERTY10>
</TAG1>
```

```
<PROPERTY1>=oslevel –r
<PROPERTY2>=vmstat
.
.
.
<PROPERTY 6>=nsradmin variant
<PROPERTY 7>=navisnccli/symcli variant
<PROPERTY 8>=navisnccli/symcli variant
<PROPERTY 9>=sansurfer/HBAanywhere or other S/W variant
<PROPERTY 10>=sansurfer/HBAanywhere or other S/W variant
```

```
<TAG2>
<PROPERTY1><OS VERSION=X></PROPERTY1>
<PROPERTY2><MEMORY=Y></PROPERTY2>
<PROPERTY3<MULTIPATHING CONFIG=X></PROPERTY3>
<PROPERTY4><PATCH VERSION=X></PROPERTY4>
<PROPERTY5><BACKUP SOFTWARE VERSION=X></PROPERTY5>
<PROPERTY6><SERVER PARALLELISM=X></PROPERTY6>
<PROPERTY7><READ CACHE=X></PROPERTY7>
<PROPERTY8><WRITE CACHE=X></PROPERTY8>
<PROPERTY9><HBA=X></PROPERTY9>
<PROPERTY10><SAN SOFTWARE VERSION=X></PROPERTY10>
</TAG2>
```

```
<TAG3>
<PROPERTY1><OS VERSION=X></PROPERTY1>
<PROPERTY2><MEMORY=X></PROPERTY2>
<PROPERTY3<MULTIPATHING CONFIG=Y></PROPERTY3>
<PROPERTY4><PATCH VERSION=Y></PROPERTY4>
<PROPERTY5><BACKUP SOFTWARE VERSION=X></PROPERTY5>
<PROPERTY6><SERVER PARALLELISM=X></PROPERTY6>
<PROPERTY7><READ CACHE=X></PROPERTY7>
<PROPERTY8><WRITE CACHE=X></PROPERTY8>
<PROPERTY9><HBA=X></PROPERTY9>
<PROPERTY10><SAN SOFTWARE VERSION=X></PROPERTY10>
</TAG3>
```

FIG. 3B

```
502
┌─────────────────────────────────────────────────────────────┐
│ C:\                    Select Administrator: C:\Windows\system3│
├─────────────────────────────────────────────────────────────┤
│ C:\Users\Administrator>nsradmin                             │
│ NetWorker administration program.                           │
│ Use the "help" command for help.                            │
│ nsradmin> p type :nsr device;                               │
│                       type: NSR device;     ← 504           │
│                       name: "rd-10.63.28.106:10.31.78.56_centaur_20"; │
│                    comment: ;                               │
│                description: ;                               │
│    device access information: "10.31.78.56:/centaur_20";    │
│        enable fibre channel: No;                            │
│      fiber channel hostname : ;                             │
│               message_I18N: mounted protectpoint disk 10317856ppoint.001; │
│                    message: mounted protectpoint disk 10317856ppoint.001; │
│                volume name: 10317856ppoint.001;             │
│               media family: disk;                           │
│                 media type: protectpoint;                   │
│                    enabled: Yes;                            │
│                  read only: No;                             │
│            target sessions: 6;                              │
│               max sessions: 60;                             │
│           max nsrmmd count: 4;                              │
│         verify label on eject: No;                          │
│              parent jukebox: ;                              │
│           cleaning required: No ;                           │
│           cleaning interval: ;                              │
│          date last cleaned: ;                               │
│       auto media management: No ;                           │
│                       ndmp: No ;                            │
│      dedicated storage node: ;                              │
│                      hosts: 10.31.78.56;                    │
│                remote user: ddvdisk1;                       │
│                   password: *******;                        │
│                 hardware id: ;                              │
│                    path id: ;                               │
│                        CDI: Not used;                       │
│       Warn on suspect volumes<%>: 80;                       │
│            TapeAlert Critical: ;                            │
│            TapeAlert Warning: ;                             │
└─────────────────────────────────────────────────────────────┘
```

FIG. 5

```
         TapeAlert Information: ;
              WORM capable: No;
           DLTWORM capable: No;
      WORM cartridge present: No;
         device serial number: ;
          Network Write Size: 8192;
                     Server: ;
           Cloud CA Certificate: ;
         Send/Receive Timeout: 90;
            Number of Retries: 3;
    Network Failure Retry Interval: 5;
                Compression: Compression Speed Fast;
                 Encryption: AES 256 Encryption;
                  Throttling: No;
                  bandwidth: ;
           restricted data zone: ;
Nsradmin> _
```

PREDICTIVE AND CORRECTIVE CONFIGURATION CHECKER

BACKGROUND OF THE INVENTION

Heterogeneous software environments, for example in enterprise scale environments, have multiple components, each with different configuration settings. Examples of these software components include backup applications, security applications, data protection applications, content management systems, record management systems, accounting/financial applications, and data applications. Configuration of these components, which ideally is resilient and responsive, may be aided by software components called configuration checkers. Configuration checkers are an additional plug-in for a component that may not be resilient nor responsive. There remains a need for better configuration checkers.

BRIEF DESCRIPTION OF THE DRAWINGS

Various embodiments of the invention are disclosed in the following detailed description and the accompanying drawings.

FIG. 2A is an illustration of tags and properties for an example of a backup software component.

FIG. 2B is an illustration of a command structure to populate a tag.

FIG. 3A is an illustration of continuous monitoring.

FIG. 3B is an illustration of on-demand monitoring.

FIG. 5 gives a sample screenshot of software component configuration properties.

DETAILED DESCRIPTION

Figure 1:
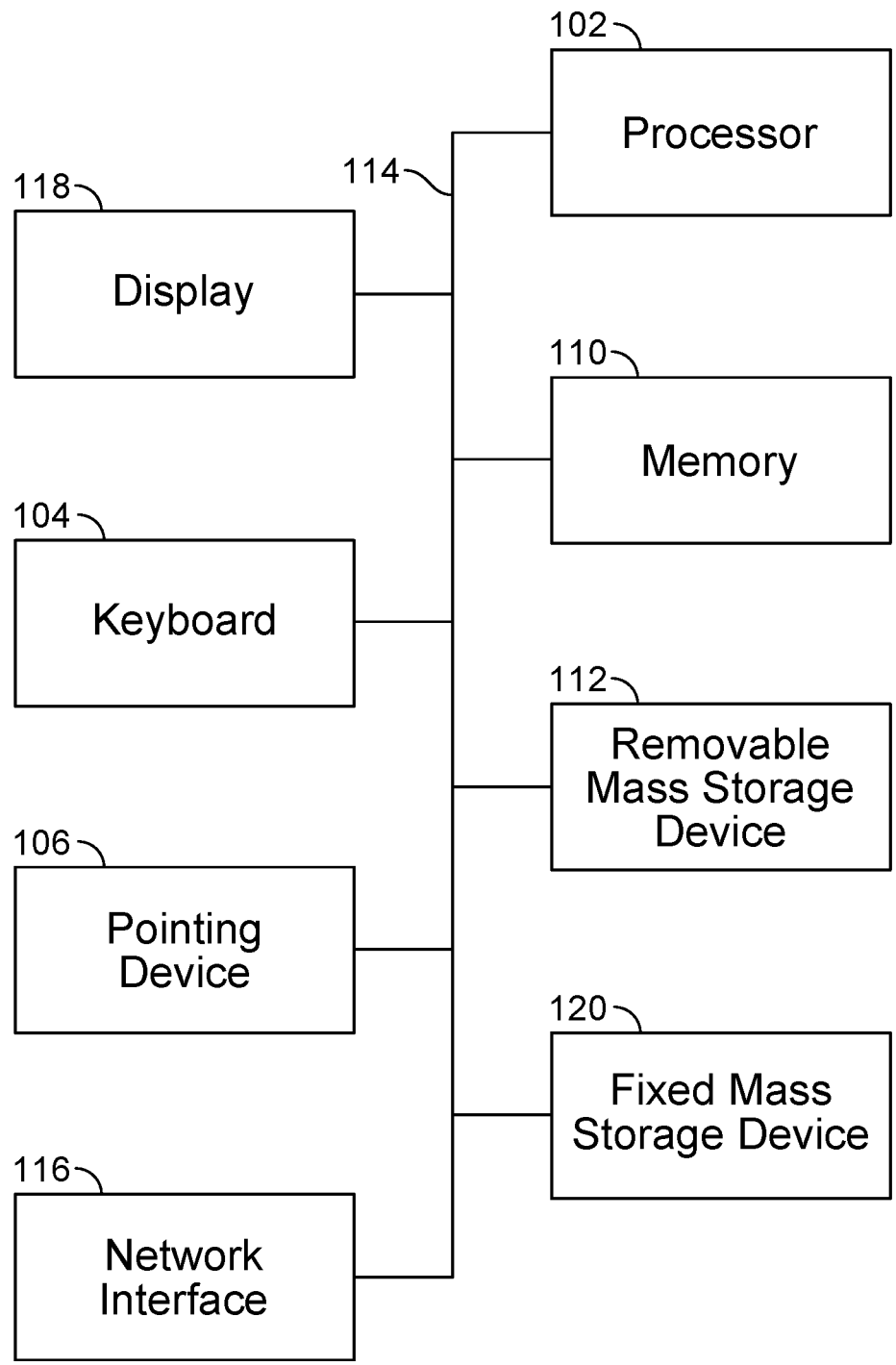
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A predictive and corrective configuration checker is disclosed. Traditional configuration checkers are considered an additional plug-in that require maintenance, and are static tools that use a list of generic issues and workarounds known at the time of the design of the configuration checker. They are traditionally qualitative tools that do not directly depend on quantitative data and analytics, and are thus not dynamic and/or real-time robust engines. Traditionally, configuration checkers are reporting tools, and require substantive learning to understand how to 'interpret' reports to troubleshoot and/or fix issues, and may act as release notes for configuration, describing configuration conflicts, compliance, and how to avoid issues.

By contrast, a predictive and corrective configuration checker determines, dynamically at the time of execution, what/why/how a configuration settings has changed during a changed environment, and possibly how to rollback one or more settings to get out of the changed environment. Such a predictive and corrective configuration checker proactively predicts issues for customers and periodically checks vital parameters, to efficiently notify users who recently ran or will run into issues. In one embodiment, the predictive and corrective configuration checker UI is made intuitive with regards to its environments to increase efficiency and tool confidence.

Using real-time monitoring and analysis to provide predictive and responsive analysis and/or corrective actions of configuration is disclosed. State and value pairs of different parameters are snapshotted and indexed, and are referred throughout this specification as "tagging". A tag is a logical schema with a specified timestamp that contains one or more state and value pairs. The predictive and corrective checker compares and find differences between different tags, and provides facility to take corrective action by rolling back software configuration and/or environment to a previous tag in a consistent manner. Unlike backup software that backs up and sometimes rolls back data, this facility is designed for software configuration and environment.

TAGGING. Throughout this specification, "tagging", the use of the term "tags" and the use of the term "bookmarks" is considered interchangeable. Each tag reflects an image of a particular point in time. A tag refers to a state and has information about the value/configuration of different parameters which impacts and influence the system state. For example, for a backup application, a tag may capture: operating system version, patch details, memory settings, semaphore settings, process settings, filesystem layout, multipathing, backup software values, parallelism, and version/build information. Users and/or administrators may be able to define and/or customize their own tags, in part by allowing user to select a parameter and corresponding command to fetch that value. In one embodiment a user provides a command for a command-line interface (CLI) to the application. All tag-related information is captured in the database for robust storage, analytics, and/or correction.

In the event of a reported issue, two tags are compared to determine the difference in parameters and configurations at two different points in time. After analysis, a user may manually or automatically be sent to earlier working parameters. In one embodiment, a user may (re)apply settings to get to an earlier set of working parameters by simply asserting (for example, by way of a mouse click) a directive like "ROLLBACK TO TAG<X>". These directives may be subdivided to the granularity of a single parameter under a given tag such as "ROLLBACK TO TAG<X>.PARAMETER<Y>.

Users may also define a polling interval to capture various parameters for tagging. In one embodiment a user may also purge tags based on time and/or sequence if required, although in a preferred embodiment every tag would be retained by default unless otherwise specified.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Tags and Properties. FIG. 2A is an illustration of tags and properties for an example of a backup software component. Functionality of backup software depends upon proper optimization of its own modules, and proper optimization of the ecosystem/infrastructure. It is challenging for users to keep track of parameters/states that include operating system, filesystem, CPU, memory, processor, host bus adapter, drivers, and software including volume managers, array configuration, caching, multipathing, specific configurations, and jukeboxes.

At time A, the backup component appears to be working well. The user may tag that configuration as TAG1, as shown in FIG. 2A. A tag is a logical schema, here showed as a markup language, with timestamp. In one embodiment the tag is stored in a database which has values set for parameters a user flags as ones to monitor, assess and calibrate.

In FIG. 2A, TAG1 (202) comprises ten properties, each using a markup language markup instruction (also known as a tag) to demarcate the property value. In the example shown in FIG. 2A, each property is stored as a simple string, but any person having ordinary skill in the art will understand without loss of generality that more complex ways of assigning values/variables may be used.

In the example shown, an OS version of "X" ("X" here being shown to illustrate an actual value, not necessarily that the value is identical for each property) is stored as property 1, a memory value of is stored as property 2, a multipathing configuration is stored as property 3. Patch version is stored as property 4, a backup software version is stored as property 5, and a server parallelism is stored as property 6. A read cache value is stored as property 7, a write cache value is stored as property 8, a host bus adapter is stored as property 9, and a SAN software version is stored as property 10.

The set in FIG. 2A is merely representative, and in an actual application may include hundreds of values without loss of generality. Parameters and values may be baselined so that if a user realizes time A is a "known good" state, time A's tag may be stored to improve functionality or performance of the software.

FIG. 2B is an illustration of a command structure to populate a tag. An developer, administrator and/or user may feed commands used to fetch a required value. In the example shown an operating system CLI command is used, but any person having ordinary skill in the art realizes that without loss of generality the technique may be extended to other CLI commands, graphical user interface (GUI) commands, interprocess commands, and other command types. The database may store each property as a key value pair.

In the example (252) shown, to generate PROPERTY1 from FIG. 2A, the OS version, the configuration checker may execute the CLI command "oslevel -r". Similarly, to determine PROPERTY2 from FIG. 2A, the memory, the configuration checker may execute the CLI command "vmstat". Thus the results of these CLI commands may be substituted into the corresponding X in FIG. 2A. The examples shown in FIG. 2A and FIG. 2B may be stored in one or more databases.

Monitoring. There are at least two monitoring techniques; continuous monitoring and on-demand monitoring.

FIG. 3A is an illustration of continuous monitoring. In the example, an agent runs continuously on a host to monitor any variance in the parameters of interest. Any change is logged as a new tag. For example, as shown in FIG. 3A (302) if the value of PROPERTY2 has changed, a new tag is declared as TAG2 and stored with timestamp as shown in FIG. 3A. In the example shown and as highlighted, after CLI command "vmstat" is run, a new value is detected "Y", so TAG2 includes PROPERTY2, "MEMORY=Y".

FIG. 3B is an illustration of on-demand monitoring. In the example, polling is scheduled for parameters and values, and nothing else is changed. Similar to continuous monitoring, tags and values are stored, but in contrast on-demand monitoring creates a tag irrespective if any values have changed. In the example shown (352), both PROPERTY3 and PROPERTY4 have changed at TAG3 and so they are shown highlighted.

In one embodiment, whenever a new tag is created, a user/group/system will be sent a notification. The notification may be customized to highlight what values have changed from a baseline tag. For the example shown (352), TAG1 represents a baseline and TAG3 is a newly generated tag with Tag 3 wherein PROPERTY3 and PROPERTY4 are different. A user may receive an email as follows:
SUBJECT: TAG 3 CREATED @<TIMESTAMP>
BODY: New tag TAG3 has been created @ TIMESTAMP. The following variance was seen with respect to the baseline tag TAG1:

| PROPERTY | COMMAND | VALUE @ TAG1 | VALUE @ TAG3 |
|---|---|---|---|
| 3 | COMMAND 3 | X | Y |
| 4 | COMMAND 4 | X | Y |

With said email, a user, group, and/or system (automated or otherwise) may observe if software at the time of TAG3 is working to a satisfactory level, and determine whether these changes in values have positive or negative influence on performance or functionality of the software.

Differencing.

Either on-demand or continuous monitoring are a resident/continual process for the predictive and/or corrective configuration checker. At any point in time, a user, group and/or system may select two tags and compare the changes between them. Throughout this specification, this is termed as "differencing"; that is differencing between two tags.

A sample differencing report is:

| PROPERTY | COMMAND | VALUE @ TAG1 | VALUE @ TAG3 | STATUS |
|---|---|---|---|---|
| 1 | COMMAND 1 | X | X | NO CHANGE |
| 2 | COMMAND 2 | X | X1 | CHANGE |
| 3 | COMMAND 3 | X | Y | CHANGED |

| PROPERTY | COMMAND | VALUE @ TAG1 | VALUE @ TAG3 | STATUS |
|---|---|---|---|---|
| 4 | COMMAND 4 | X | Z | CHANGED |
| 5 | COMMAND 5 | X | X | NO CHANGE |
| 6 | COMMAND 6 | X | X | NO CHANGE |
| 7 | COMMAND 7 | X | A | CHANGED |
| 8 | COMMAND 8 | X | B | CHANGED |
| 9 | COMMAND 9 | X | C | CHANGED |
| 10 | COMMAND 10 | X | D | CHANGED |

In some embodiments, a user, group, and/or system may filter out all the parameters that show status as "CHANGED" or "NO CHANGE". Reports as the ones shown above may also be stored in a database so that users, groups and/or systems may further structure or refine queries, for example "LIST TAGS WHERE VALUE OF PROPERTY X WAS NOT EQUAL to X", to show when the variance was seen for the first time against the baseline tag, or "LIST TAGS WHERE VALUE OF PROPERTY Y WAS GREATER THAN 3500", to show if there exists a tag where memory went above 3 GB.

The above are simply examples of what a user, group, and/or system may define either at the property, command, tag, scheduling and/or reporting level. Any person having ordinary skill in the art that the framework and model disclosed is fully scalable and expandable for the needs of different users, groups, systems, levels of automation, and software components. Throughout this specification the term "user" may also refer to an automated system, which can perform quantitative analysis to allow the configuration checker to be predictive, including the quantitative analysis of trends and the use of trendlines.

Corrective Actions.

Monitoring and differencing form powerful services and pieces of an analytic engine for the configuration checker. In some embodiments, a strong proactive mechanism is corrective action, also known as calibration and/or resurrection. This would allow a user, group and/or system to reinstate back a specific tag in its entirety and/or revert selective properties for the tag. Being selective is important as not necessarily all the variance from a baseline tag has a negative impact. For example, multipathing from "Round Robin" to "Active"; in multipathing "Active" may be strongly desired and changed deliberately. Reverting an entire tag to a previous baseline would override all values including inadvertently changing multipathing.

Similar to the database schema shown in FIG. 2B, commands stored in database may be used to set or reset values to baseline. Complex software systems with multiple levels of state may not revert values with simple commands, and warnings or errors are recorded when attempting to change a value. An example is if the operating system version is changed from Solaris 10 to Solaris 11; it would be neither possible nor desirable to simply change the operating system version back to Solaris 10. An example of changing values would be using the multipathing software value above, and changing it from Active-Active to Round-Robin using commands specified in database. The changing of values to a previous baseline is termed a "rollback" throughout this specification.

In some embodiments, any rollback would lead to a new tag to be stored in the database with the audit log updated to know when the action was initiated and by whom or what system. An additional feature of corrective action is security; any change may only be initiated by people or systems who retain rights/credentials for said change. In one embodiment a normal user would not have access to corrective action.

As an example of how tags derived from corrective action is stored in the database, "TAG10: <TAG CREATION=ADMINISTRATOR INITIATED ROLLBACK FOR TAG10–TAG5>" may be stored when an entire TAG10 is rolled back to TAG5. Another example is that "TAG 11: <TAG CREATION=ADMINISTRATOR INITIATED ROLLBACK FOR TAG 10.PROPERTY1–TAG 7.PROPERTY1>" may be stored when PROPERTY1 of TAG10 is rolled back to PROPERTY1 of TAG7.

In one embodiment, at least two methods are supported for rollbacks. The first is "ROLLBACK TO TAGX", which reverts all values (where feasible) to a previous tag, which can either be a baseline tag or any other intermittent tag. The second is "ROLLBACK TO TAGX.PROPERTY1", which reverts the values of one or more specified properties only to that of a previous (baseline or intermittent) tag.

In one embodiment, the same rollback concepts may be used to "roll forward". For example, an intermediate tag may be a tag created every single hour in a 24 hour window. At the end of the day a user will thus have 24 tags created and may conventionally roll back to TAG11. A "roll forward" may mean a user rolls to TAG15 from TAG11. Thus two additional methods for roll forwards, similar to rollbacks, would be "SWITCH TO TAGX" and "SWTICH TO TAGX.PROPERTY1".

EXAMPLES

Figure 4A:
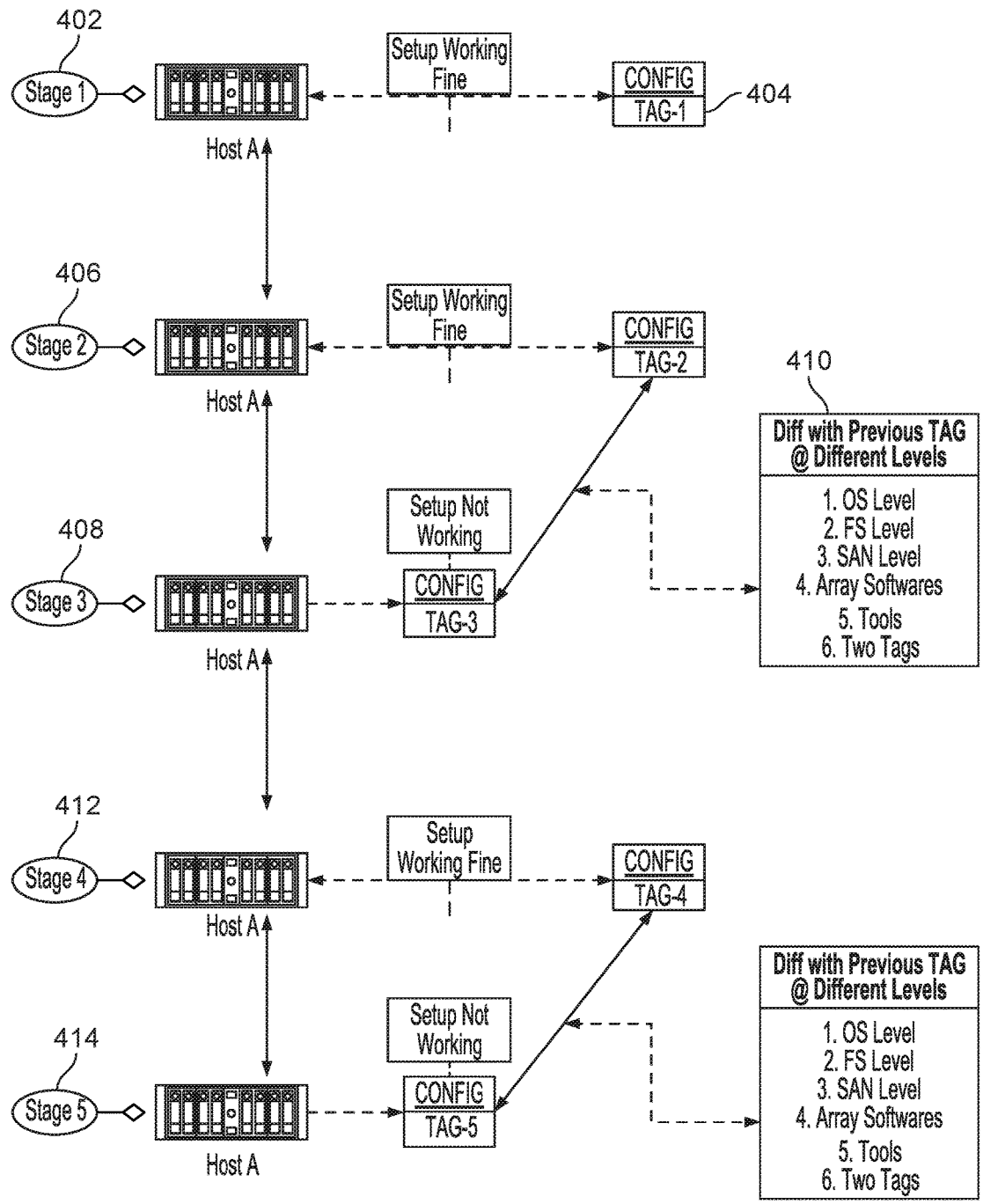
FIG. 4A is a simple example of how the predictive and corrective configuration checker operates.

FIG. 4A is a simple example of how the predictive and corrective configuration checker operates. At stage 1 (402), a host "HOST A" baselines a working setup by generating TAG-1 (404). Time passes and a new tag is generated at stage 2 (406), TAG-2. At stage 3 (408), it's detected that the environment/configuration is not working at intermediate tag TAG-3. A differencing report 410 is generated showing various properties that are different between TAG-2 (working) and TAG-3 (not working), including OS level, FS level, SAN level, array configuration, tool setup, and two tags. The cycle repeats for stage 4 (412) where TAG-4 is a baseline tag, and in stage 5 (414) again an intermediate tag TAG-5 is shown to be an issue, so that a differencing report between TAG-4 and TAG-5 is generated.

Figure 4B:
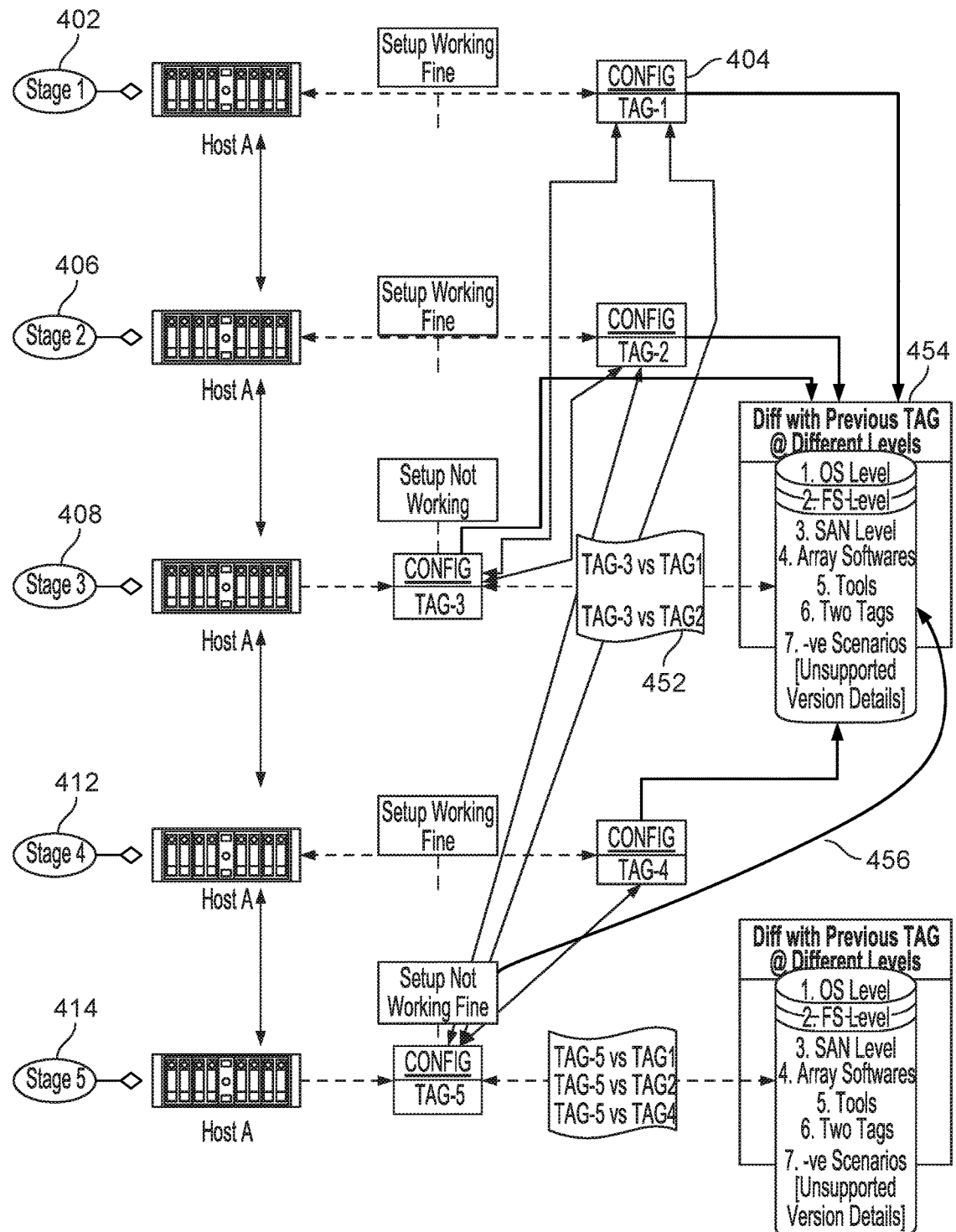
FIG. 4B is a more complex example of how the checker operates.

FIG. 4B is a more complex example of how the checker operates. In this example, the same stages (402, 406, 408, 412, 414) and tags (404) are generated, but analysis is done between a higher-order of memory than simply the last baseline tag as shown by the diamond ended arcs. For example, at stage 3 (408), an analysis is done (452) comparing both TAG-3 with TAG-1 and TAG-3 with TAG-2. This results in a stronger differencing report 454 for the database. Similarly, at stage 5 (414), all baselines are considered: TAG-1, TAG-2, and TAG-4 when TAG-5 is shown to not work. An additional analysis shown by the diamond-ended arc (456) is that a previous differencing report may be referenced for future differencing reports.

FIG. 5 gives a sample screenshot of software component configuration properties. In the example shown (502), there are circled configuration properties (504) that are pertinent and stored with tags in the database.

Figure 6:
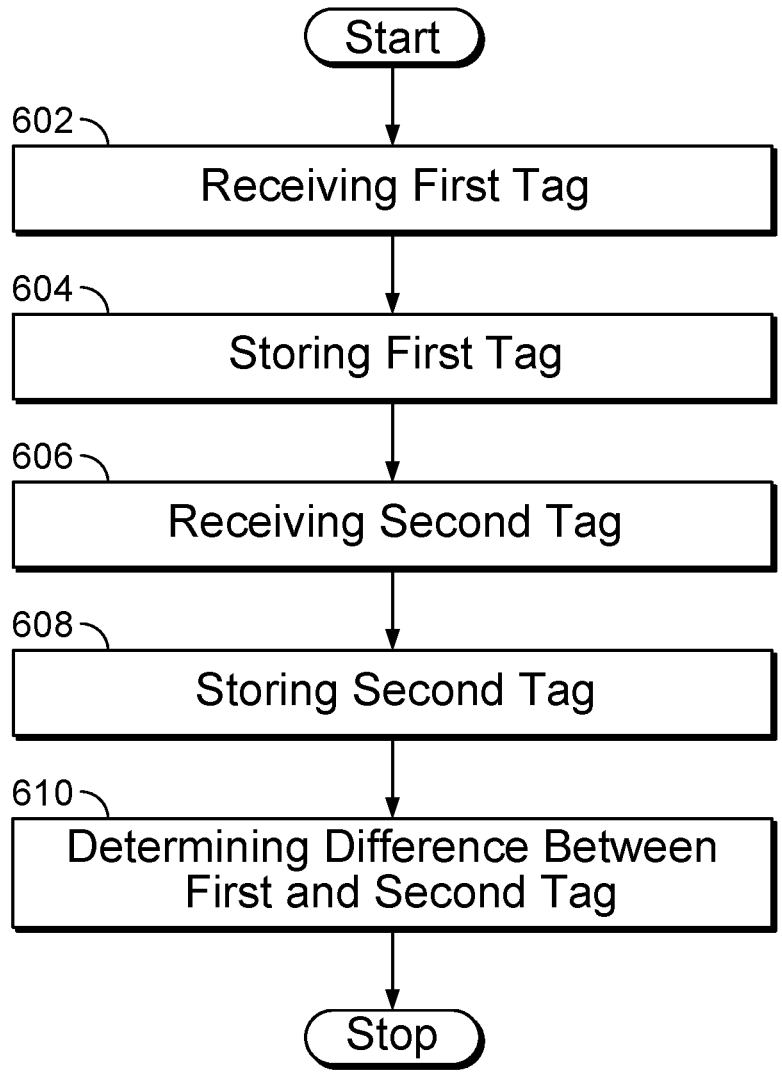
FIG. 6 is a block diagram illustrating an embodiment for the checker.

FIG. 6 is a block diagram illustrating an embodiment for the checker. In step 602, a first configuration tag is received from a host, wherein each configuration tag comprises a configuration state and a configuration value pair for a given software. In the example shown in FIG. 4A, TAG-1 is a (first) baseline tag. In step 604, the first configuration tag is stored with a first timestamp, preferably in database. In step 606, a second configuration tag is received from the host. In the example shown in FIG. 4A, TAG-3 is such a (second) tag. In step 608, the second configuration tag is stored with a second timestamp, preferably in database. In step 610, a difference is determined between the first configuration tag and the second configuration tag. In the example shown in FIG. 4A, a differencing report 410 is used.

Another step (not shown in FIG. 6) may include receiving a rollback indication to rollback configuration, and/or reconfiguring the host based at least in part on the difference. In one embodiment, reconfiguring the host comprises reverting values for configuration states that permit automatic changing and reporting values for configuration states that do not permit automatic changing. In one embodiment, the rollback indication is authenticated based at least in part on user credentials. In one embodiment, the rollback indication specifies an entire configuration tag to rollback to. In one embodiment, the rollback indication specifies only one or more specific properties of a configuration tag to rollback to. In one embodiment, the rollback indication specifies a later configuration tag to rollback to, wherein the later configuration tag has a later timestamp than a current configuration tag. In one embodiment, the rollback indication is given in a single user interface transaction.

Another step (not shown in FIG. 6) may include receiving a tag specification, wherein the tag specification comprises a command for software on the host. In one embodiment, the command is a command-line interface (CLI) command. In one embodiment, the first configuration tag is a baseline configuration tag. In one embodiment, the second configuration tag is received based on continuous monitoring. In one embodiment, the second configuration tag is received based on on-demand monitoring.

Another step (not shown in FIG. 6) may include reporting the difference. In one embodiment, reporting comprises listing tags where a value of a specified property has a Boolean relationship with a value. In one embodiment, reporting comprises listing tags where a value of a specified property has a Boolean relationship with another specific property. In one embodiment, the software is backup software. In one embodiment, a property of a configuration tag comprises one or more of the following: operating system version, patch details, memory settings, semaphore settings, process settings, filesystem layout, multipathing, backup software values, parallelism, version, build information, filesystem information, SAN information, array software, tool information, CPU information, memory information, processor information, HBA, driver information, volume management information, jukebox information, and read/write cache information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a first configuration tag from a host, wherein each configuration tag comprises a configuration state and a configuration value pair for a given software;
   storing the first configuration tag with a first timestamp;
   monitoring the host using a resident process for on-demand or continuous monitoring;
   receiving a second configuration tag from the host, based on monitoring the host;
   storing the second configuration tag with a second timestamp;
   differencing between the first configuration tag and the second configuration tag;
   receiving a corrective action, wherein the corrective action indicates a calibration and/or resurrection to reinstate a selective property for the first configuration tag and a security credential;
   reconfiguring the host by rolling back the selective property based at least in part on the corrective action, based at least in part on a retained right associated with the security credential, and based at least in part on the differencing between the first configuration tag and the second configuration tag;
   receiving a rollback indication to rollback configuration, wherein the rollback indication specifies only one or more specific properties of a configuration tag to rollback to; and
   reconfiguring the host based at least in part on the difference.

2. The method of claim 1, wherein reconfiguring the host comprises reverting values for configuration states that permit automatic changing and reporting values for configuration states that do not permit automatic changing.

3. The method of claim 1, wherein the rollback indication is authenticated based at least in part on user credentials.

4. The method of claim 1, wherein the rollback indication specifies an entire configuration tag to rollback to.

5. The method of claim 1, wherein the rollback indication specifies a later configuration tag to rollback to, wherein the later configuration tag has a later timestamp than a current configuration tag.

6. The method of claim 1 wherein the rollback indication is given in a single user interface transaction.

7. The method of claim 1 further comprising:
   receiving a tag specification, wherein the tag specification comprises a command for software on the host.

8. The method of claim 7, wherein the command is a command-line interface (CLI) command.

9. The method of claim 1, wherein the first configuration tag is a baseline configuration tag.

10. The method of claim 1, wherein the second configuration tag is received based on continuous monitoring.

11. The method of claim 1, wherein the second configuration tag is received based on on-demand monitoring.

12. The method of claim 1, further comprising reporting the difference.

13. The method of claim 12, wherein reporting comprises listing tags where a value of a specified property has a Boolean relationship with a value.

14. The method of claim 12, wherein reporting comprises listing tags where a value of a specified property has a Boolean relationship with another specific property.

15. The method of claim 1, wherein the software is backup software.

16. The method of claim 1, wherein a property of a configuration tag comprises one or more of the following: operating system version, patch details, memory settings, semaphore settings, process settings, filesystem layout, multipathing, backup software values, parallelism, version, build information, filesystem information, SAN information, array software, tool information, CPU information, memory information, processor information, HBA, driver information, volume management information, jukebox information, and read/write cache information.

17. A system, comprising:
    a processor configured to:

receive a first configuration tag from a host, wherein each configuration tag comprises a configuration state and a configuration value pair for a given software;
store the first configuration tag with a first timestamp;
monitor the host using a resident process for on-demand or continuous monitoring;
receive a second configuration tag from the host, based on monitoring the host;
store the second configuration tag with a second timestamp;
differencing between the first configuration tag and the second configuration tag;
receive a corrective action, wherein the corrective action indicates a calibration and/or resurrection to reinstate a selective property for the first configuration tag and a security credential;
reconfigure the host by rolling back the selective property based at least in part on the corrective action, based at least in part on a retained right associated with the security credential, and based at least in part on the differencing between the first configuration tag and the second configuration tag;
receive a rollback indication to rollback configuration, wherein the rollback indication specifies only one or more specific properties of a configuration tag to rollback to; and
reconfigure the host based at least in part on the difference;
and
a memory coupled to the processor and configured to provide the processor with instructions.

18. A computer program product, the computer program product being embodied in a non-transitory computer readable storage medium and comprising computer instructions for:
receiving a first configuration tag from a host, wherein each configuration tag comprises a configuration state and a configuration value pair for a given software;
storing the first configuration tag with a first timestamp;
monitoring the host using a resident process for on-demand or continuous monitoring;
receiving a second configuration tag from the host, based on monitoring the host;
storing the second configuration tag with a second timestamp;
differencing between the first configuration tag and the second configuration tag;
receiving a corrective action, wherein the corrective action indicates a calibration and/or resurrection to reinstate a selective property for the first configuration tag and a security credential;
reconfiguring the host by rolling back the selective property based at least in part on the corrective action, based at least in part on a retained right associated with the security credential, and based at least in part on the differencing between the first configuration tag and the second configuration tag;
receiving a rollback indication to rollback configuration, wherein the rollback indication specifies only one or more specific properties of a configuration tag to rollback to; and
reconfiguring the host based at least in part on the difference.

* * * * *